United States Patent
Lim et al.

(10) Patent No.: US 11,105,677 B2
(45) Date of Patent: Aug. 31, 2021

(54) ELECTRONIC DEVICES WITH SWITCHABLE DIFFUSERS

(71) Applicant: Apple Inc., Cupertino, CA (US)

(72) Inventors: Junhwan Lim, Cupertino, CA (US); Zhibing Ge, Los Altos, CA (US); Christopher L. Boitnott, Redwood City, CA (US); Shih-Wei Chang, San Jose, CA (US); Sang Un Choi, San Jose, CA (US); Sudirukkuge T. Jinasundera, San Jose, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 16/141,183

(22) Filed: Sep. 25, 2018

(65) Prior Publication Data

US 2019/0137333 A1    May 9, 2019

Related U.S. Application Data

(60) Provisional application No. 62/582,206, filed on Nov. 6, 2017.

(51) Int. Cl.
*G01J 1/04*      (2006.01)
*G01J 1/42*      (2006.01)
(Continued)

(52) U.S. Cl.
CPC .......... *G01J 1/0474* (2013.01); *G01J 1/4204* (2013.01); *G02F 1/1334* (2013.01);
(Continued)

(58) Field of Classification Search
CPC ... G01J 1/0474; G01J 1/4204; G02F 1/13318; G02F 1/1334; G02F 1/1339;
(Continued)

(56) References Cited

U.S. PATENT DOCUMENTS 6,847,428 B1 *  1/2005  Sekiguchi ............. G02F 1/1334
                                                            349/139
7,088,418 B1 *  8/2006  Yamashita .......... G02F 1/13394
                                                            349/153

(Continued)

FOREIGN PATENT DOCUMENTS

EP         1076257 A2     2/2001
EP         1213601 A1     6/2002
(Continued)

*Primary Examiner* — John R Lee
(74) *Attorney, Agent, or Firm* — Treyz Law Group, P.C.; Kendall W. Abbasi

(57) ABSTRACT

An electronic device may be provided with a display. An optical component window may be formed in the inactive area of the display. The optical component window may transmit infrared light from an infrared light source. The infrared light source may include a diffuser to allow the light source to operate in a flood illumination mode and a structured light mode. The diffuser may include liquid crystal material between first and second substrates. A sealant may surround the liquid crystal layer, and one or more spacer walls may be located between the sealant and the liquid crystal layer. An additional spacer wall may be used outside of the sealant to prevent metal from creating an electrical short between electrodes in the diffuser. Conductive material in the sealant may be used to couple a top electrode to a metal pad on a bottom substrate.

21 Claims, 10 Drawing Sheets

(51) Int. Cl.
*G02F 1/133* (2006.01)
*G06F 3/03* (2006.01)
*G06F 3/041* (2006.01)
*G09G 3/34* (2006.01)
*G02F 1/1339* (2006.01)
*G02F 1/1334* (2006.01)
*G09G 3/20* (2006.01)
*G02F 1/137* (2006.01)
*G02F 1/1333* (2006.01)

(52) U.S. Cl.
CPC ........ *G02F 1/1339* (2013.01); *G02F 1/13318* (2013.01); *G02F 1/13394* (2013.01); *G06F 3/0304* (2013.01); *G06F 3/041* (2013.01); *G09G 3/20* (2013.01); *G09G 3/3406* (2013.01); *G02F 1/13756* (2021.01); *G02F 1/133388* (2021.01); *G02F 2203/11* (2013.01); *G09G 2320/06* (2013.01); *G09G 2360/144* (2013.01)

(58) Field of Classification Search
CPC .................. G02F 1/13394; G02F 1/137; G02F 2001/133388; G02F 2001/13756; G02F 2203/11; G06F 3/0304; G06F 3/041; G09G 3/20; G09G 3/3406; G09G 2320/06; G09G 2360/144
See application file for complete search history.

(56) References Cited

U.S. PATENT DOCUMENTS

| | | | |
|---|---|---|---|
| 10,334,184 B2 * | 6/2019 | Wang | H04N 5/33 |
| 2007/0297184 A1 * | 12/2007 | Isely | F21V 21/06 |
| | | | 362/382 |
| 2010/0157585 A1 * | 6/2010 | Diekmann | H01L 27/32 |
| | | | 362/228 |
| 2012/0091923 A1 * | 4/2012 | Kastner-Jung | B60Q 3/745 |
| | | | 315/360 |
| 2017/0336836 A1 * | 11/2017 | Morsky | G06F 21/32 |
| 2017/0356620 A1 * | 12/2017 | Kaehler | F21V 19/006 |
| 2018/0081093 A1 * | 3/2018 | Wang | G02B 5/0294 |
| 2019/0068853 A1 * | 2/2019 | Price | G02B 27/425 |
| 2019/0137333 A1 * | 5/2019 | Lim | G02F 1/1334 |

FOREIGN PATENT DOCUMENTS

| | | |
|---|---|---|
| EP | 1734501 A1 | 12/2006 |
| EP | 1728231 B1 | 1/2009 |
| EP | 2487539 A1 | 8/2012 |
| EP | 2818914 B1 | 3/2016 |

* cited by examiner

ELECTRONIC DEVICES WITH SWITCHABLE DIFFUSERS

This application claims the benefit of provisional patent application No. 62/582,206, filed Nov. 6, 2017, which is hereby incorporated by reference herein in its entirety.

FIELD

This relates generally to electronic devices, and, more particularly, to electronic devices with optical components such as diffusers.

BACKGROUND

Electronic devices such as laptop computers, cellular telephones, and other equipment are sometimes provided with light-based components such as light-emitting diodes, lasers, cameras, light sensors, and other light-emitting and light-detecting components.

Optical systems may be incorporated into an electronic device to help manipulate light associated with light-based components. For example, an optical system may be included in an electronic device to diffuse light, to filter light, to focus or collimate light, or to otherwise manipulate light that is being emitted or detected with light-based components. In some situations, optical systems may include light diffusers. For example, a light diffuser may be used to diffuse light emitted from a light source.

If care is not taken, components for optical systems in an electronic device such as light diffusers may be subject to manufacturing defects such as bubbles, broken seals, or undesirable tolerances. It would therefore be desirable to be able to provide improved optical systems with light diffusers for electronic devices.

SUMMARY

An electronic device may be provided with a display. The display may be overlapped by a display cover layer. An opaque layer may be formed on an inner surface of the display cover layer in an inactive area of the display. An optical component window may be formed from the opening. Optical component windows may also be formed in other portions of an electronic device.

The electronic device may include optical components such as infrared imaging systems and other devices that emit and/or detect light. Infrared imaging systems may incorporate diffusers. The diffuser may be switchable to allow the light source to operate in a flood illumination mode and a structured light mode. The diffuser may include liquid crystal material between first and second substrates. A sealant may surround the liquid crystal layer, and one or more spacer walls may be located between the sealant and the liquid crystal layer. An additional spacer wall may be used outside of the sealant to prevent metal from creating an electrical short between electrodes in the diffuser. Conductive material in the sealant may be used to couple a top electrode to a metal pad on a bottom substrate.

DETAILED DESCRIPTION

Figure 1:
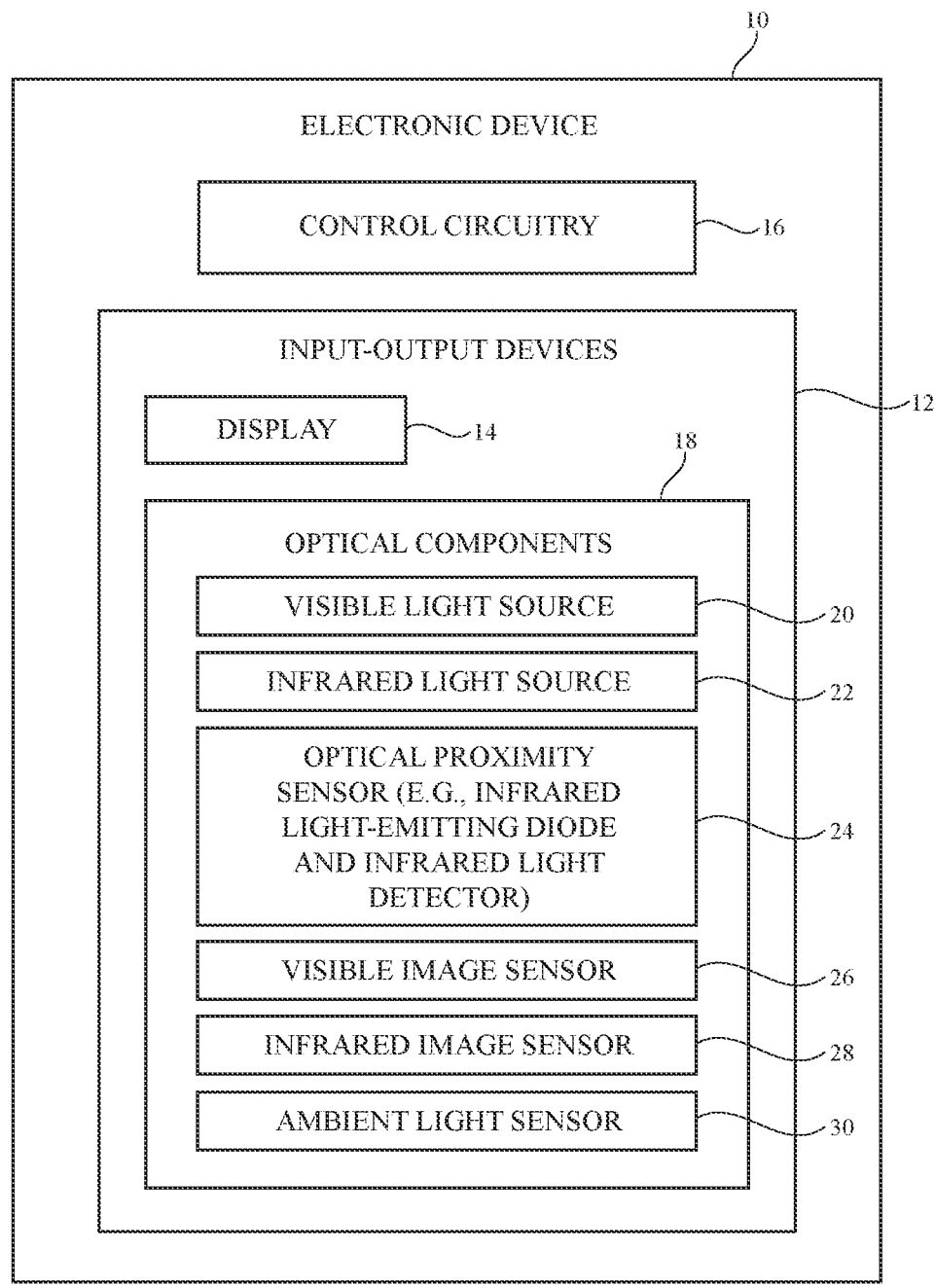
FIG. 1 is a schematic diagram of an illustrative electronic device in accordance with an embodiment.

A schematic diagram of an illustrative electronic device of the type that may be provided with an optical component such as a diffuser is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Device 10 may have input-output circuitry such as input-output devices 12. Input-output devices 12 may include user input devices that gather user input and output components that provide a user with output. Devices 12 may also include communications circuitry that receives data for device 10 and that supplies data from device 10 to external devices. Devices 12 may also include sensors that gather information from the environment.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be a liquid crystal display, a light-emitting diode display (e.g., an organic light-emitting diode display), an electrophoretic display, or other display.

Input-output devices 12 may include optical components 18. Optical components 18 may include light-emitting diodes and other light sources. As an example, optical components 18 may include one or more visible light sources such as light source 20 (e.g., a light-emitting diode). Light-emitting diode 20 may provide constant illumination (e.g., to implement a flashlight function for device 10) and/or may emit pulses of flash illumination for a visible light camera such as visible light image sensor 26. Optical components 18 may also include an infrared light source (e.g., a laser, lamp, infrared light-emitting diode, an array of vertical-cavity surface-emitting lasers (VCSELs), etc.) such as infrared light source 22. Infrared light source 22 may provide constant and/or pulsed illumination at an infrared wavelength such as 940 nm, a wavelength in the range of 800-1100 nm, etc. For example, infrared light source 22 may provide constant illumination for an infrared camera such as infrared image sensor 28. Infrared image sensor 28 may, as an example, be configured to capture iris scan information from the eyes of a user and/or may be used to capture images for a facial recognition process implemented on control circuitry 16.

If desired, infrared light source 22 may be used to provide flood illumination (e.g., diffused infrared light that uniformly covers a given area) and to provide structured light (e.g. a pattern of collimated dots). Flood illumination may be used to capture infrared images of external objects (e.g., to detect a user's face and/or to create a depth map), whereas structured light may be projected onto an external object to perform depth mapping operations (e.g., to obtain a three-dimensional map of the user's face).

To enable light source 22 to provide both flood illumination and structured light, light source 22 may include a switchable diffuser and a collimated light source such as a laser or an array of vertical cavity surface-emitting lasers. When flood illumination is desired, the diffuser may be turned on to diffuse the light from the light source. When structured illumination is desired, the diffuser may be turned off to allow the collimated light to pass through the diffuser uninhibited. Diffusers such as the diffuser in light source 22 may be formed from liquid crystal material, electrophoretic material, or other switchable light modulators. In some implementations, light source 22 projects light through a diffractive optical element (DOE) to create replicas of the pattern of dots.

Optical components 18 may also include optical proximity detector 24 and ambient light sensor 30.

Optical proximity detector 24 may include an infrared light source such as an infrared light-emitting diode and a corresponding light detector such as an infrared photodetector for detecting when an external object that is illuminated by infrared light from the light-emitting diode is in the vicinity of device 10.

Ambient light sensor 30 may be a monochrome ambient light sensor that measures the intensity of ambient light or may be a color ambient light sensor that measures ambient light color and intensity by making light measurements with multiple photodetectors each of which is provided with a corresponding color filter (e.g., color filter that passes red light, blue light, yellow light, green light, or light of other colors) and each of which therefore responds to ambient light in a different wavelength band.

In addition to optical components 18, input-output devices 12 may include buttons, joysticks, scrolling wheels, touch pads, key pads, keyboards, microphones, speakers, tone generators, vibrators, cameras, light-emitting diodes and other status indicators, non-optical sensors (e.g., temperature sensors, microphones, capacitive touch sensors, force sensors, gas sensors, pressure sensors, sensors that monitor device orientation and motion such as inertial measurement units formed from accelerometers, compasses, and/or gyroscopes), data ports, etc. A user can control the operation of device 10 by supplying commands through input-output devices 12 and may receive status information and other output from device 10 using the output resources of input-output devices 12.

Figure 2:
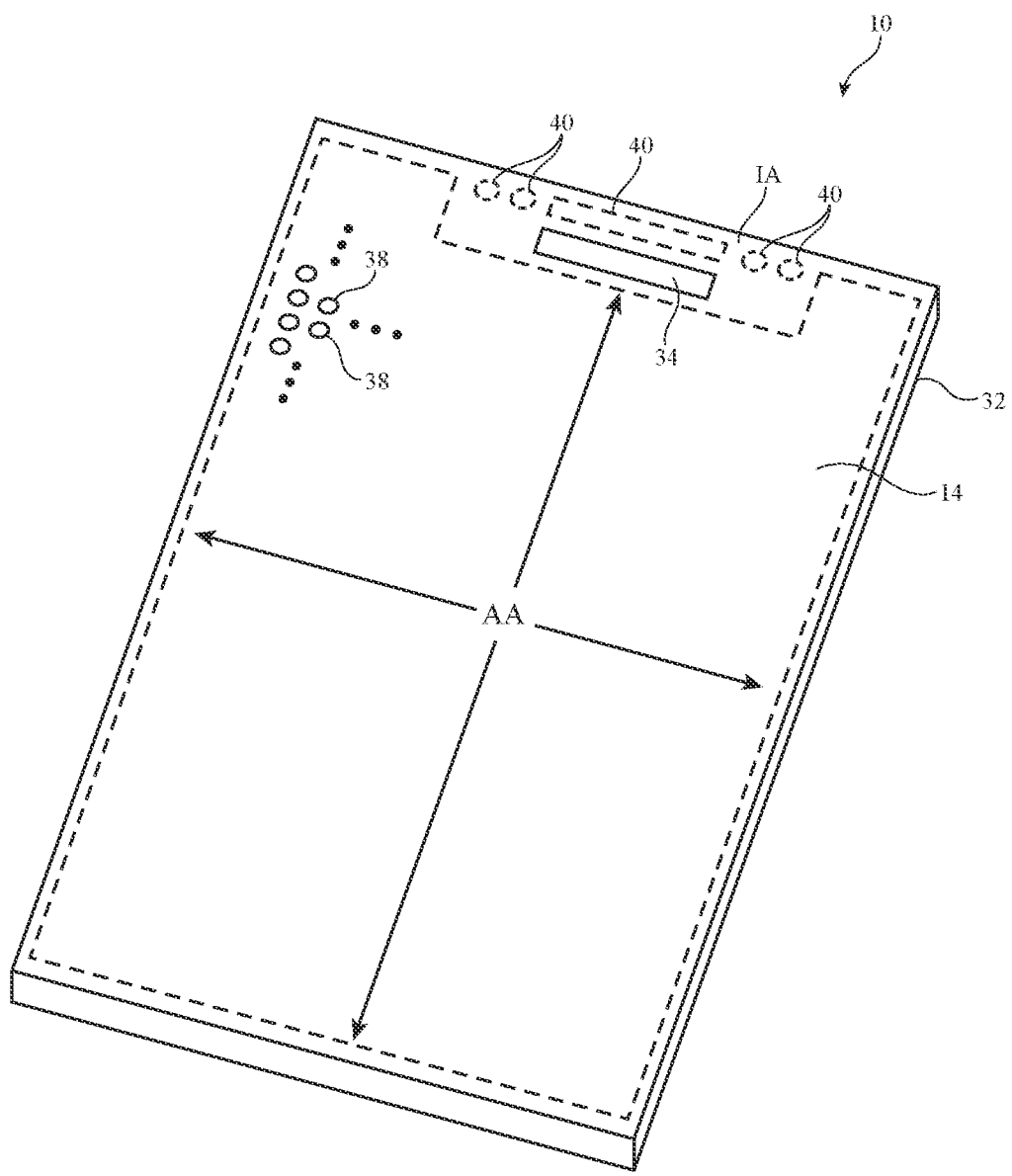
FIG. 2 is a perspective view of an illustrative electronic device with a display having optical component windows overlapping optical components such as an ambient light sensor in accordance with an embodiment.

Device 10 may have a housing. The housing may form a laptop computer enclosure, an enclosure for a wristwatch, a cellular telephone enclosure, a tablet computer enclosure, or other suitable device enclosure. A perspective view of a portion of an illustrative electronic device is shown in FIG. 2. In the example of FIG. 2, device 10 includes a display such as display 14 mounted in housing 32. Housing 32, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 32 may be formed using a unibody configuration in which some or all of housing 32 is machined or molded as a single structure or may be formed using multiple structures (e.g., an internal frame structure, one or more structures that form exterior housing surfaces, etc.). Housing 32 may have any suitable shape. In the example of FIG. 2, housing 32 has a rectangular outline (footprint when viewed from above) and has four peripheral edges (e.g., opposing upper and lower edges and opposing left and right edges). Sidewalk may run along the periphery of housing 32.

Display 14 may be protected using a display cover layer such as a layer of transparent glass, clear plastic, sapphire, or other clear layer (e.g., a transparent planar member that forms some or all of a front face of device 10 or that is mounted in other portions of device 10). Openings may be formed in the display cover layer. For example, an opening may be formed in the display cover layer to accommodate a button, a speaker port such as speaker port 34, or other components. Openings may be formed in housing 32 to form communications ports (e.g., an audio jack port, a digital data port, etc.), to form openings for buttons, etc. In some configurations, housing 32 may have a rear housing wall formed from a planar glass member or other transparent layer (e.g., a planar member formed on a rear face of device 10 opposing a front face of device 10 that includes a display cover layer).

Display 14 may have an array of pixels 38 in active area AA (e.g., liquid crystal display pixels, organic light-emitting diode pixels, electrophoretic display pixels, etc.). Pixels 38 of active area AA may display images for a user of device 10. Active area AA may be rectangular, may have notches along one or more of its edges, may be circular, may be oval, may be rectangular with rounded corners, and/or may have other suitable shapes.

Inactive portions of display 14 such as inactive border area IA may be formed along one or more edges of active area. AA. Inactive border area IA may overlap circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink (e.g., polymer containing black dye and/or black pigment, opaque materials of other colors, etc.) and/or other layers (e.g., metal, dielectric, semiconductor, etc.). Opaque masking materials such as these may also be formed on an inner surface of a planar rear housing wall formed from glass, ceramic, polymer, crystalline transparent materials such as sapphire, or other transparent material.

In the example of FIG. 2, speaker port 34 is formed from an elongated opening (e.g., a strip-shaped opening) that extends along a dimension parallel to the upper peripheral edge of housing 32. A speaker may be mounted within device housing 32 in alignment with the opening for speaker port 34. During operation of device 10, speaker port 34 serves as an ear speaker port for a user of device 10 (e.g., a user may place opening 34 adjacent to the user's ear during telephone calls).

Optical components 18 (e.g., a visible digital image sensor, an infrared digital image sensor, a light-based proximity sensor, an ambient light sensor, visible and/or infrared light-emitting diodes that provide constant and/or pulsed illumination, etc.) may be mounted under one or more optical component windows such as optical component windows 40. In the example of FIG. 2, four of windows 40 have circular outlines (e.g., circular footprints when viewed from above) and one of windows 40 has an elongated strip-shaped opening (e.g., an elongated strip-shaped footprint when viewed from above). The elongated window 40 is mounted between the sidewall along the upper peripheral edge of device 10 and speaker port 34 and extends parallel to the upper peripheral edge of housing 32. If desired, windows such as optical windows 40 may have shapes other than circular and rectangular shapes. The examples of FIG. 2 are merely illustrative.

Optical component windows such as windows 40 may be formed in inactive area IA of display 14 (e.g., an inactive border area in a display cover layer such as an inactive display region extending along the upper peripheral edge of housing 32) or may be formed in other portions of device 10 such as portions of a rear housing wall formed from a transparent member coated with opaque masking material, portions of a metal housing wall, polymer wall structures, etc. In the example of FIG. 2, windows 40 are formed adjacent to the upper peripheral edge of housing 32 between speaker port opening 34 in the display cover layer for display 14 and the sidewall along the upper edge of housing 32. In some configurations, an opaque masking layer is formed on the underside of the display cover layer in inactive area IA and optical windows 40 are formed from openings within the opaque masking layer. To help optical windows 40 visually blend with the opaque masking layer, a dark ink layer, a metal layer, a thin-film interference filter formed from a stack of dielectric layers, and/or other structures may be overlap windows 40.

Figure 3:
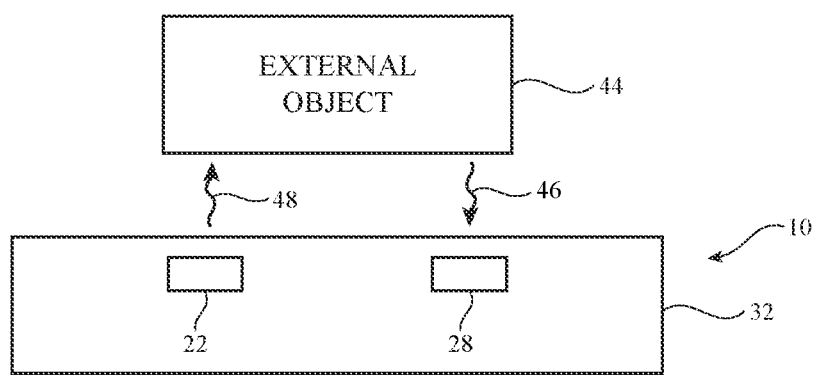
FIG. 3 is a cross-sectional side view of an illustrative electronic device that has optical components such as a light source and an image sensor in accordance with an embodiment.

In some modes of operation, device 10 may emit infrared light. Consider, as an example, a scenario in which control circuitry 16 of device 10 is using infrared image sensor 28 to capture eye scan information, facial images (e.g., images of a user's face for use in performing face recognition operations to authenticate the user of device 10), and/or three-dimensional depth mapping information. As shown in FIG. 3, device 10 may use infrared light source 22 (e.g., an infrared light-emitting diode, an infrared laser, etc.) to produce infrared light 48. Light 48 may illuminate external objects in the vicinity of device 10 such as external object 44 (e.g., a user's face and/or eyes). Reflected infrared light 46 from external object 44 may be received and imaged using infrared digital image sensor 28 to produce infrared images of the face and/or eyes.

Infrared light source 22 may operate in different modes depending on the type of infrared information to be gathered by infrared camera 28. For example, in flood illumination mode, light source 22 may emit diffused light that uniformly covers a desired target area. In a structured light mode, light source 22 may emit a known pattern of light onto a desired target area.

Figure 4:
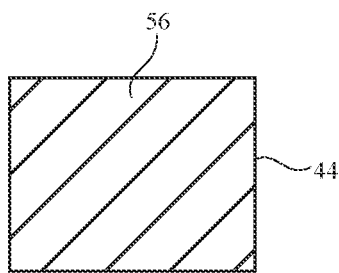
FIG. 4 is a cross-sectional side view of an illustrative light source that includes a diffuser in accordance with an embodiment.

FIG. 4 illustrates illumination from light source 22 when light source 22 is operated in a flood illumination mode. As shown in FIG. 4, light source 22 may emit diffused infrared light 56 that continuously covers a given area of external object 44. Infrared camera 28 may capture an infrared image of the diffusely illuminated external object 44. In some arrangements, flood illumination from light source 22 may be used to detect a user's face during face identification operations.

Figure 5:
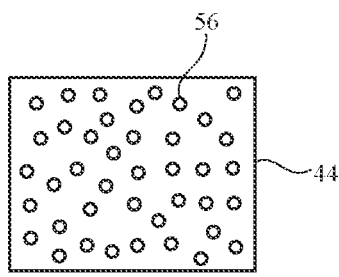
FIG. 5 is a front view of an illustrative object on which a dot pattern is projected using a light source of the type shown in FIG. 4 in accordance with an embodiment.

FIG. 5 illustrates illumination from light source 22 when light source 22 is operated in a structured light mode. In structured light mode, light source 22 may project a known pattern of infrared light 56 onto external object 44. In the example of FIG. 5, infrared light 56 forms a pattern of dots on external object 44. The dots may be in an ordered grid array (e.g., uniformly spaced from one another), or the dots may be projected in a random speckle pattern. This is, however, merely illustrative. If desired, light source 22 may emit structured light in other patterns (e.g., horizontal lines, vertical lines, a grid of horizontal and vertical lines, or other suitable predetermined pattern). Structured infrared light 44 of FIG. 5 may be based on laser interference or may be based on a projection display element that emits infrared light through a spatial light modulator to create the desired pattern.

In some arrangements, light source 22 may include one light source that provides flood illumination and another light source that provides structured light. In other arrangements, the same light source may be used to provide both flood illumination and structured light. This may be achieved using a switchable diffuser element that selectively diffuses light emitted from the light source. This type of arrangement is shown in FIG. 6.

Figure 6:
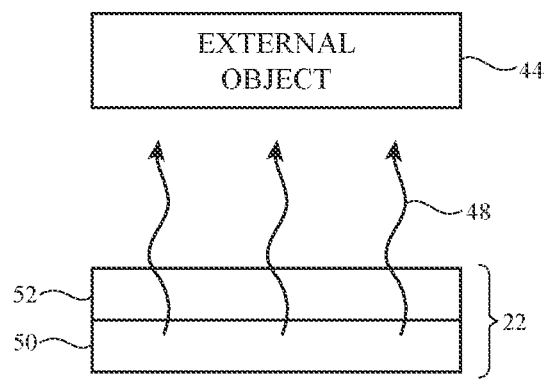
FIG. 6 is a front view of an illustrative object which is fully illuminated using a light source of the type shown in FIG. 4 in accordance with an embodiment.

As shown in FIG. 6, light source 22 may include light-emitting element 50 and switchable diffuser 52. Light-emitting element 50 may be a laser or other light source that emits collimated infrared light 48 through switchable diffuser 52 towards external object 44. Diffuser 52 may be formed from a switchable element that is configured to selectively alter the collimated light from light-emitting element 50. Switchable diffuser 52 may be operable in at least first and second states. In the first state, diffuser 52 may scatter the collimated light from source 50 to produce diffused flood illumination of the type shown in FIG. 4. In the second state, diffuser 52 may pass the collimated light from source 50 without altering the light. This allows light 48 to reach object 44 as structured light as shown in the example of FIG. 5. Switchable diffuser 52 may be configured in an on state (to diffuse light 48 during flood illumination mode), an off state (to pass light 48 unaltered during a structured light mode), or optionally one or more intermediate states between the on and off states. In some implementations, light source 22 includes projection optics and a diffractive optical element.

Figure 7:
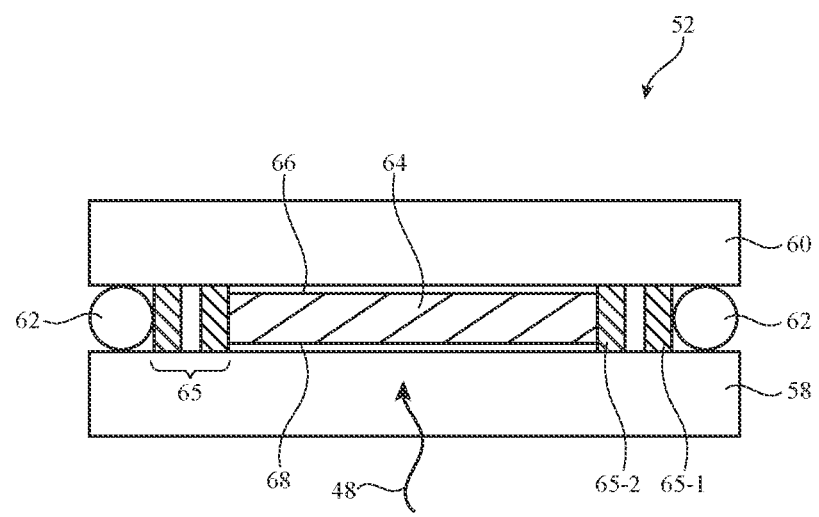
FIG. 7 is a cross-sectional side view of an illustrative diffuser having liquid crystal material surrounded by a sealant and column spacer walls in accordance with an embodiment.

FIG. 7 is a cross-sectional side view of an illustrative diffuser for light source 22. As shown in FIG. 7, diffuser 52 may include liquid crystal material 64 (e.g., polymer network liquid crystal, polymer dispersed liquid crystal, polymer-stabilized liquid crystal, nematic liquid crystal, or other suitable liquid crystal) between transparent substrates 58 and 60. Substrates 58 and 60 may be formed from glass, sapphire, plastic, or other transparent substrate material. Electrodes such as electrodes 66 and 68 may be formed on the inner surfaces of substrates 60 and 58, respectively, and may be used to control the state of liquid crystal material 64. Electrodes 66 and 68 may be implemented using a transparent conductive material such as indium tin oxide, indium zinc oxide, other transparent conductive oxide material, and/or a layer of metal that is sufficiently thin to be transparent. In some arrangements, electrode 66 may be a common electrode that receives a common electrode voltage (sometimes referred to as Vcom) and electrode 68 may be a signal electrode that receives a signal electrode voltage (sometimes referred to as Vp).

During operation, electrode structures 66 and 68 may be used to apply a controlled electric field (i.e., a field having a magnitude proportional to Vp-Vcom) across liquid crystal material 64 in diffuser 52. The electric field that is produced across liquid crystal material 64 causes a change in the orientation of the liquid crystals in liquid crystal material 64. This change in orientation of the liquid crystals may be used to control the amount of scattering that light 48 experiences as it passes through diffuser 52. For example, when an electric field is applied (e.g., when light source 22 is operated in flood illumination mode), light 48 may be scattered in liquid crystal layer 64 to produce diffused light of the type shown in FIG. 4. When no electric field is applied (e.g., when light source 22 is operated in a structured light mode), light 48 may pass through diffuser 52 unaltered to produce structured light of the type shown in FIG. 5.

A sealant such as light-curable and/or thermal-curable sealant 62 may be used to attach substrate 60 to substrate 58. Sealant 62 may form a peripheral border that surrounds liquid crystal material 64 and that prevents leakage of liquid crystal material 64 at the edges of diffuser 52. Sealing adhesive 62 may be a light-curable adhesive such as ultraviolet epoxy or other ultraviolet-light-curable material.

In some arrangements, diffuser 52 may be formed using a liquid crystal dropping method (sometimes referred to as one-drop filling). In this type of arrangement, a line of sealant 62 is dispensed onto a substrate (either substrate 58 or substrate 60). The line of sealant may form a continuous perimeter (e.g., a continuous rectangle or loop) around a central area or the line of sealant may have one or more gaps. The line of sealant may have a rectangular shape, a circular shape, an oval shape, or other suitable shape. Liquid crystal material 64 is dropped onto the substrate within the line of sealant 62, and then substrates 58 and 60 are assembled to one another under a vacuum.

If care is not taken, liquid crystal material may compromise the surrounding sealant during vacuum assembly operations. For example, as the substrates are pressed together, liquid crystal may spread outwardly towards the sealant, which in turn can lead to breaks in the sealant, overflow of the liquid crystal beyond the sealant, contamination of the liquid crystal by contacting the sealant, or bubbles in the liquid crystal.

To avoid these issues, one or more spacer walls may be used to separate the liquid crystal from the surrounding sealant. As shown in FIG. 7, for example, spacer structure 65 may be interposed between liquid crystal 64 and sealant 62. Spacer structures such as spacer structure 65 may be formed from photoresist (e.g., acrylic), other polymers, or non-polymer materials. Photolithographic techniques may be used to pattern spacers on layers such as substrate 60 and/or substrate 58. In the example of FIG. 7, spacer structure 65 includes outer spacer wall 65-1 and inner spacer wall 65-2. Spacer walls 65-1 and 65-2 may form continuous perimeters around liquid crystal material 64 or spacers walls 65-1 and 65-1 may have one or more gaps or openings.

As shown in FIG. 7, outer spacer wall 65-1 may contact sealant 62. The contact between spacer wall 65-1 and sealant 62 helps avoid an enclosed space from forming between sealant 62 and spacer 65-1 which would tend to attract liquid crystal 64 during vacuum assembly operations. To avoid a similar issue between outer spacer wall 65-1 and inner spacer wall 65-2, inner spacer wall 65-2 may have one or more gaps. Inner spacer wall 65-2 may be used to slow down liquid crystal material 64 as is spreads outwardly during vacuum assembly operations.

Outer spacer wall 65-1 may also be used to control the spreading of sealant 62. In arrangements where sealant 62 is left uncured until after vacuum assembly operations, sealant 62 may be prone to spreading when substrates 58 and 60 are assembled. Inhibiting the spread of sealant 62 may be helpful in maintaining a desired volume within diffuser 52 for liquid crystal material 64. A predictable cell volume within sealant 62 may in turn allow for more accurate calculations of the amount of liquid crystal 64 needed during one-drop-fill operations.

The example of FIG. 7 in which outer spacer wall 65-1 contacts sealant 62 is merely illustrative. If desired, a gap may be present between outer spacer wall 65-1 and sealant 62.

Figure 8:
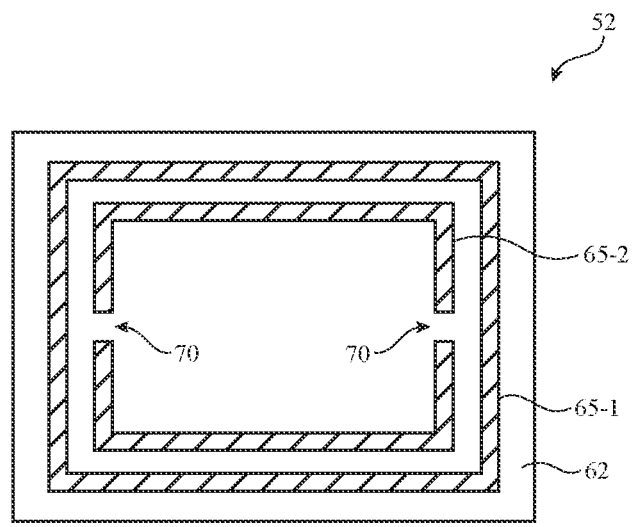
FIG. 8 is a top view of an illustrative sealant and column spacer wall arrangement in which an outer spacer wall has no openings and an inner spacer wall has two openings in accordance with an embodiment.
Figure 9:
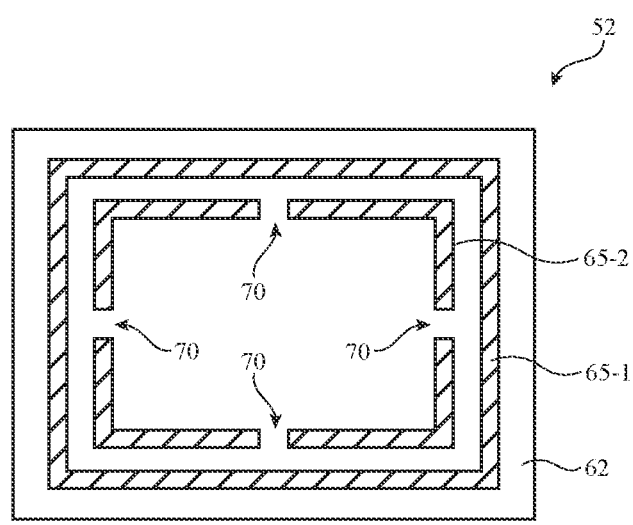
FIG. 9 is a top view of an illustrative sealant and column spacer wall arrangement in which an outer spacer wall has no openings and an inner spacer wall has four openings in accordance with an embodiment.
Figure 10:
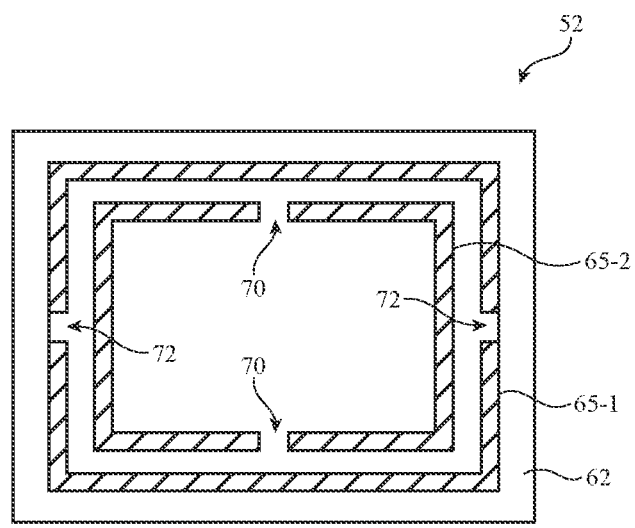
FIG. 10 is a top view of an illustrative sealant and column spacer wall arrangement in which an outer spacer wall and an inner spacer wall each have two openings in accordance with an embodiment.

Illustrative examples of spacer wall patterns that may be used for spacer structure 65 in diffuser 52 are shown in FIGS. 8, 9, and 10.

In the example of FIG. 8, outer spacer wall 65-1 forms a continuous rectangular loop without gaps, whereas inner spacer wall 65-2 forms a rectangular loop with an opening 70 in each of two opposing sides of the rectangular loop. If desired, there may be greater or fewer than two openings 70 in inner spacer wall 65-2. The example of FIG. 8 is merely illustrative.

In the example of FIG. 9, outer spacer wall 65-1 forms a continuous rectangular loop without gaps, whereas inner spacer wall 65-2 forms a rectangular loop with an opening 70 in each of the four sides of the rectangular loop. If desired, there may be greater or fewer than four openings 70 in inner spacer wall 65-2. The example of FIG. 9 is merely illustrative.

In the example of FIG. 10, both outer spacer wall 65-1 and inner spacer wall 65-2 form rectangular loops with gaps. Inner spacer wall 65-2 has openings 70 in each of two opposing sides of the rectangular loop, and outer spacer wall 65-1 has openings 72 in each of two opposing sides of the rectangular loop. As shown in FIG. 10, openings 70 and 72 may be offset from one another to avoid a direct path for liquid crystal 64 (FIG. 7) to reach sealant 62. If desired, there may be greater or fewer than two openings in each spacer wall. The example of FIG. 10 is merely illustrative.

The examples of FIGS. 8, 9, and 10 in which sealant 62 and spacer walls 65-1 and 65-2 form rectangular perimeters (e.g., rectangular loops) around the liquid crystal material are merely illustrative. If desired, sealant 62 and spacer walls 65-1 and 65-2 may have other shapes (e.g., oval, circular, or other suitable shape).

Similarly, the examples of FIGS. 8, 9, and 10 that show vertical openings in spacer structure 65 (e.g., vertical openings that extend between upper substrate 60 and lower substrate 58) are merely illustrative. If desired, openings 70 and/or openings 72 may be horizontal openings that extend between liquid crystal layer 64 and sealant 62. Horizontal openings may be a series of slits, gaps, or holes of any suitable shape (rectangular, circular, etc.). Horizontal openings may extend only across short segments of spacer structure 65 or may extend continuously around some or all of the perimeter of spacer structure 65. In general, openings in spacer structure 65 may have any suitable shape, size, number, or orientation.

Electrodes 66 and 68 of diffuser 52 may be coupled to metal pads. In some arrangements, both metal pads may be formed on the same substrate. For example, a first metal pad coupled to signal electrode 68 may be formed on lower substrate 58 and a second metal pad coupled to common voltage electrode 66 may also be formed on lower substrate 58. Since common electrode 66 is located on top substrate 60, conductive structures may be used to couple common electrode 66 on top substrate 60 to the metal pad on bottom substrate 58. This type of arrangement is illustrated in FIGS. 11-15.

Figure 11:
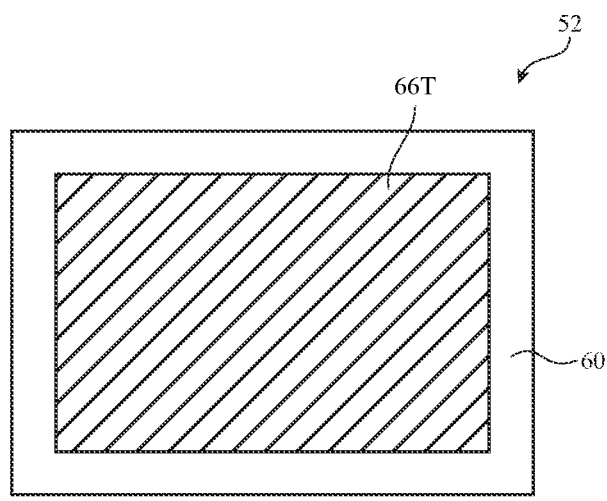
FIG. 11 is a bottom view of an illustrative top substrate in a diffuser in accordance with an embodiment.

FIG. 11 shows a bottom view of upper substrate 60. As shown in FIG. 11, top common voltage electrode 66T may be formed from a blanket layer of transparent conductive oxide such as indium tin oxide on substrate 60. Top common voltage electrode 66T may cover the active area of diffuser 52.

Figure 12:
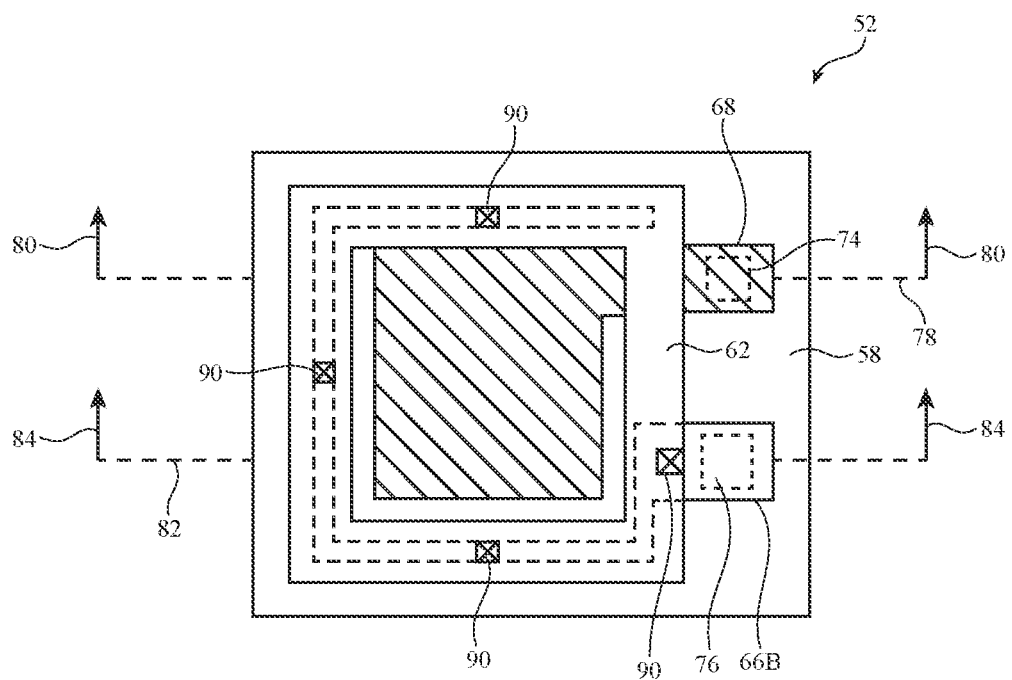
FIG. 12 is a top view of an illustrative bottom substrate in a diffuser in accordance with an embodiment.

FIG. 12 shows a top view of lower substrate 58. As shown in FIG. 12, signal voltage electrode 68 may be formed on lower substrate 58, but may cover a smaller portion of the active area of diffuser 52 than top common voltage electrode 66T. Metal pads such as metal pads 74 and 76 may be used to couple electrodes 66 and 68 to control circuitry in device 10. Signal voltage electrode 68 may be coupled to metal pad 74, and common voltage electrode 66 may be coupled to metal pad 76. To couple top common voltage electrode 66T on upper substrate 60 to metal pad 76 on lower substrate 58, diffuser 52 may include a conductive structure in sealant 62.

A top portion of the conductive structure may be coupled to top common voltage electrode layer 66T, and a lower portion of the conductive structure may be coupled to a bottom common voltage electrode layer 66B. As shown in FIG. 12, bottom common voltage electrode 66B is formed on lower substrate 58 and is formed adjacent to signal voltage electrode 68 without contacting signal voltage electrode 68. Connections between top common voltage electrode 66T and bottom common voltage electrode 66B may be formed at one or more locations such as locations 90.

Because sealant 62 includes conductive structures, care must be taken to ensure that the conductive structures in sealant 62 do not create an electrical short between signal voltage electrode 68 and common voltage electrode 66. To insulate sealant 62 from signal voltage electrode 68, diffuser 52 may include an insulating layer that covers signal voltage electrode 68. The passivation layer may include openings in locations 90 to allow conductive structures in sealant 62 to electrically couple top common voltage electrode 66T to bottom common voltage electrode 66B.

Figure 13:
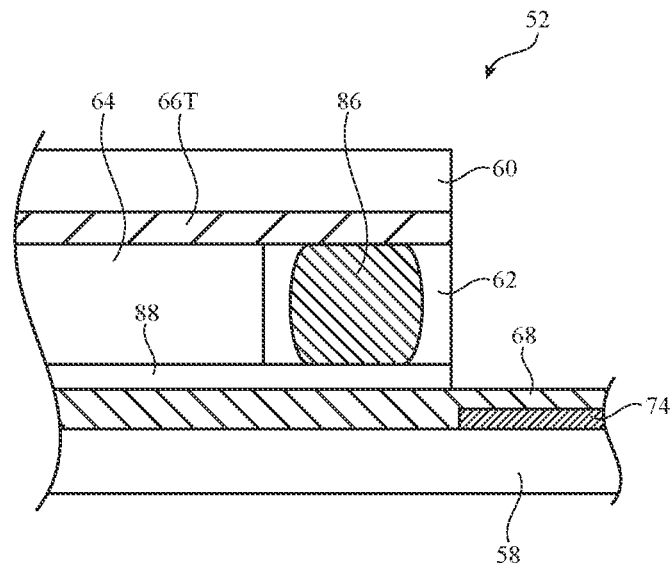
FIG. 13 is a cross-sectional side view of the diffuser of FIG. 12 in the vicinity of a metal pad that couples to a signal voltage electrode in accordance with an embodiment.

FIG. 13 is a cross-sectional side view of diffuser 52 of FIG. 12 taken along line 78 and viewed in direction 80. As shown in FIG. 13, a conductive structure such as conductive structure 86 may be formed within sealant 62. Conductive structure 86 may be a bead of conductive material such as metal (e.g., gold, silver, or other suitable metal). The top portion of conductive structure 86 may be electrically coupled to top common voltage electrode 66T. To prevent the lower portion of conductive structure 86 from creating an electrical short between top common voltage electrode 66T and signal voltage electrode 68, insulating layer 88 may be formed over signal voltage electrode 68 (e.g., between sealant 62 and signal voltage electrode 68). Insulating layer 88 may be an oxide passivation layer, may be a polymer-based insulating layer, or may be formed from other insulating materials (e.g., organic and/or inorganic insulating materials).

Figure 14:
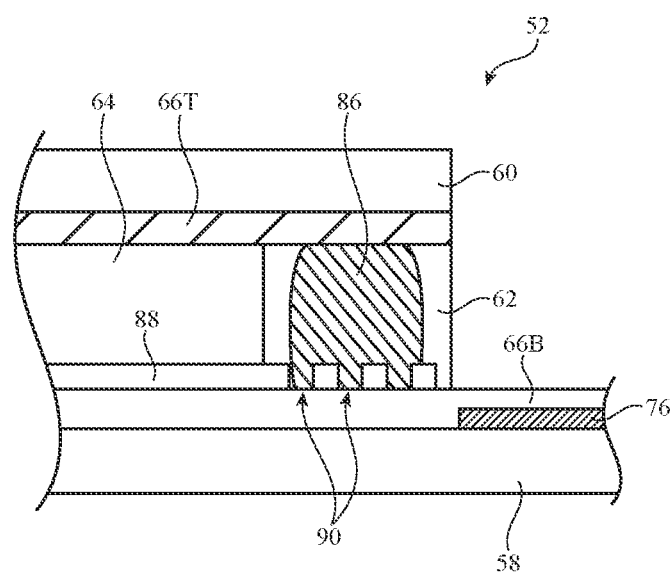
FIG. 14 is a cross-sectional side view of the diffuser of FIG. 12 in the vicinity of a metal pad that couples to a common voltage electrode in accordance with an embodiment.

FIG. 14 is a cross-sectional side view of diffuser 52 of FIG. 12 taken along line 82 and viewed in direction 84. As shown in FIG. 14, openings such as openings 90 may be formed in passivation layer 88 to allow conductive structure 86 to make contact with bottom common voltage electrode 66B. If desired, openings may be forming at multiple locations of passivation layer 88 (e.g., locations 90 of FIG. 12 and/or other suitable locations of passivation layer 88). This allows top common voltage electrode 66T to electrically couple to metal pad 76 through conductive structure 86 and bottom common voltage electrode 66B.

In some arrangements, metal may be used to enhance the electrical and mechanical connection to metal pads 74 and 76. Care must be taken, however, to ensure that the metal does not create an electrical short between top common voltage electrode 66T and signal voltage electrode 68. If desired, spacer structures may be used on the outside of sealant 62 to prevent metal from creating an electrical short between top common voltage electrode 66T and the signal voltage electrode 68. This type of arrangement is illustrated in FIG. 15.

Figure 15:
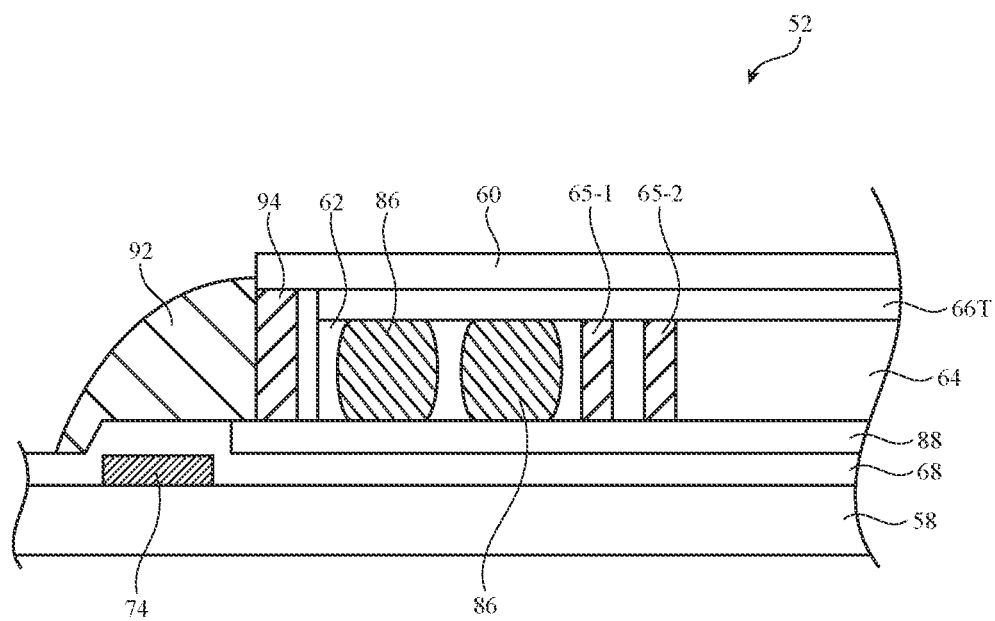
FIG. 15 is a cross-sectional side view of an illustrative diffuser having a spacer structure that prevents metal from creating an electrical short between a common voltage electrode and a signal voltage electrode in accordance with an embodiment.

FIG. 15 is a cross-sectional side view of diffuser 52 showing how one or more additional spacer structures may be used on the outside of sealant 62 to prevent an electrical short from forming between electrode layers.

Diffuser 52 includes conductive structures such as metal bead 92 (e.g., a bead of silver, gold, or other suitable metal) to enhance the connection between the transparent conductive oxide that forms electrode 68 and metal pad 74. To prevent metal bead 92 from creating an electrical short between signal voltage electrode 68 and top common voltage electrode 66T, diffuser 52 may include a spacer structure such as insulating spacer structure 94. Spacer structure 94 may be formed from a photodefinable polymer or other suitable insulating material. If desired, spacer structure 94 may be formed from the same patterned layer of photodefinable polymer that forms spacer structures 65. Spacer structure 94 may completely surround sealant 62 or may be formed selectively around portions of sealant 62. For example, spacer structure 94 need not be formed in the vicinity of pad 76 (FIG. 12) because it is not necessary to prevent metal bead 92 from contacting top common voltage electrode 66T and bottom common voltage electrode 66B, since these two electrodes are already coupled to one another using conductive structure 86. In the example of FIG. 15, there are multiple conductive beads 86 within sealant 62 to couple top common electrode 66T to bottom common electrode 66B.

The presence of spacer structure 94 and outer spacer wall 65-1 may help control the width of sealant 62. When substrates 58 and 60 are attached in vacuum assembly operations, wall 65-1 and structure 94 may inhibit the spread of sealant 62 so that a desired cell volume for liquid crystal 62 can be maintained. A predictable cell volume within sealant 62 may in turn allow for more accurate calculations of the amount of liquid crystal 64 needed during one-drop-fill operations.

The foregoing is merely illustrative and various modifications can be made to the described embodiments. The foregoing embodiments may be implemented individually or in any combination.

What is claimed is:

1. A diffuser, comprising:
first and second transparent substrates;
liquid crystal material between the first and second substrates;
a sealant surrounding the liquid crystal material; and
inner and outer spacer walls interposed between the liquid crystal material and the sealant, wherein the outer spacer wall contacts the sealant and the inner spacer wall has at least one opening.

2. The diffuser defined in claim 1 wherein the inner and outer spacer walls are separated by a gap.

3. The diffuser defined in claim 1 wherein the inner and outer spacer walls comprise polymer.

4. The diffuser defined in claim 1 wherein the outer spacer wall forms a continuous perimeter.

5. The diffuser defined in claim 4 wherein the continuous perimeter is rectangular.

6. The diffuser defined in claim 1 further comprising a first electrode formed only on the first substrate and a second electrode having a first portion formed on the first substrate and a second portion formed on the second substrate.

7. The diffuser defined in claim 6 further comprising a conductive material within the sealant that electrically couples the first portion of the second electrode to the second portion of the second electrode.

8. The diffuser defined in claim 7 further comprising a passivation layer that covers the first electrode.

9. The diffuser defined in claim 8 wherein the passivation layer has openings and wherein the conductive material is coupled to the second portion of the second electrode through the openings in the passivation layer.

10. The diffuser defined in claim 1 wherein the at least one opening in the inner spacer wall comprises first and second openings.

11. The diffuser defined in claim 10 wherein the outer spacer wall has third and fourth openings that are offset from the first and second openings.

12. The diffuser defined in claim 11 wherein at least some of the liquid crystal material is located between the inner spacer wall and the outer spacer wall.

13. An infrared light source operable in a structured light mode and a flood illumination mode, comprising:
an infrared light emitter that emits infrared light; and
a diffuser formed over the infrared light emitter, wherein the diffuser is configured to diffuse the infrared light in the flood illuminate mode and to transmit the infrared light unaltered in the structured light mode, and wherein the diffuser comprises:
a liquid crystal layer;
a spacer surrounding the liquid crystal layer; and
a sealant surrounding the spacer and the liquid crystal layer, wherein the spacer contacts the sealant.

14. The infrared light source defined in claim 13 wherein the spacer comprises acrylic.

15. The infrared light source defined in claim 13 further comprising an additional spacer between the liquid crystal layer and the spacer.

16. The infrared light source defined in claim 15 wherein the spacer comprises a continuous perimeter of material and the additional spacer has gaps.

17. The infrared light source defined in claim 13 wherein the infrared light emitter comprises a laser.

18. A diffuser, comprising:
first and second substrates;
a liquid crystal layer between the first and second substrates;
a first electrode on the first substrate;
a second electrode on the second substrate;
sealant surrounding the liquid crystal layer, wherein the sealant includes a conductive material coupled to the first electrode; and
a spacer contacting the sealant that separates the sealant from the liquid crystal layer.

19. The diffuser defined in claim 18 further comprising an additional spacer, wherein the sealant is interposed between the spacer and the additional spacer.

20. The diffuser defined in claim 18 further comprising first and second metal pads on the second substrate, wherein the first metal pad is electrically coupled to the first electrode on the first substrate and the second metal pad is electrically coupled to the second electrode on the second substrate.

21. The diffuser defined in claim 18 further comprising a passivation layer that covers the second electrode, wherein the passivation layer has openings to allow the conductive material to contact the first electrode.

* * * * *